United States Patent Office.

ROBERT G. LOFTUS, OF CHELSEA, ASSIGNOR TO HIMSELF AND OLIVER W. FARRAR, OF BOSTON, MASSACHUSETTS.

Letters Patent No. 109,327, dated November 15, 1870.

IMPROVEMENT IN INKS FOR WRITING.

The Schedule referred to in these Letters Patent and making part of the same.

*To all whom it may concern:*

Be it known that I, ROBERT G. LOFTUS, of Chelsea, in the county of Suffolk and State of Massachusetts, have invented an Acid-Proof Writing-Ink; and I do hereby declare that the following is a description of my invention sufficient to enable those skilled in the art to practice it.

My invention relates to the manufacture of an ineffaceable writing-ink, that is free-flowing in quality, permanent in color, and capable of transferring an impression in a press-copy or letter-book.

Writing effected with all of the inks now in use, so far as I know, may, by careful application of acid or chemicals, be entirely effaced, and hence such inks are obviously unfit for use in making out important legal documents and writings to be preserved.

With my improved ink no application can remove writing made with it and leave the paper unmarred.

My ink is principally composed of sulphuric acid, oil distilled from coal-tar, and water, and the method of its preparation is as follows:

I use coal-tar oil, or dead oil, such as is employed in thinning asphaltum in the manufacture of black varnish, selecting a middling oil or a medium between the heaviest and lightest.

Taking two parts of the oil (by measure) and one part of sulphuric acid, I mix them, and heat the mixture in a suitable vessel until the mixture is soluble in water, under which treatment the lighter parts of the oil are evaporated.

In practice I prefer to work with about sixty gallons of the mixture, forty of oil, and twenty of acid, boiling the mixture about six or eight hours, at a temperature of about 300°.

To one gallon of the resultant liquid I add six gallons of water, or dilute the liquid with water until a specific gravity of about eleven hundred is attained.

This mixture I boil with steam, six to eight hours, and then leach it in a vessel with iron filings to neutralize the free acid and draw off the liquid, and this completes the operation, the draw-off liquid constituting the improved ink.

The ink is a little brownish in color, but can be made jet black by the addition of bruised nut-galls in the proportion of about one ounce of galls to five gallons of ink.

This ink is proof against acid, and cannot be bleached in any way.

As before remarked, it is free-flowing, and may be used as a copying-ink, making a good, legible transfer.

It is incorrosive, penetrates into the surface of the paper, and cannot be removed.

The proportionate parts of the oil and acid employed may, of course, be varied, as may also the specific details of the preparation above described, but the proportions and process of manufacture set forth are those I most prefer.

I claim—

As a new article of manufacture, a writing-ink, made of the materials and in the manner substantially as described.

Executed September 27th, 1870.

ROBT. G. LOFTUS.

Witnesses:
J. B. CROSBY,
FRANCIS GOULD